United States Patent Office
3,361,781
Patented Jan. 2, 1968

3,361,781
PROCESS FOR THE MANUFACTURE OF ORGANIC ALKALI COMPLEX COMPOUNDS OF ALUMINUM AND/OR BORON
Karl Ziegler, Kaiser-Wilhelm-Platz 1, Mulheim (Ruhr), Germany, and Herbert Lehmkuhl and Rolf Schäfer, Mulheim (Ruhr), Germany; said Lehmkuhl and said Schäfer, assignors to Dr. Karl Ziegler, Mulheim (Ruhr), Germany
Filed Oct. 25, 1963, Ser. No. 318,993
Claims priority, application Germany, Oct. 26, 1962, Z 9,741
22 Claims. (Cl. 260—448)

ABSTRACT OF THE DISCLOSURE

Process for producing alkali organic complex of the formula $Me(ZR_3R')$ [for example $NaAl(CH_3)_4$] by reacting $ZR_3$ [for example $Al(CH_3)_3$] an alkyl halide [for example $CH_3Cl$] and alkali metal [for example Na] wherein the alkali metal is in an amalgam, and a by-product [for example, NaCl] is also produced.

Figure 1:
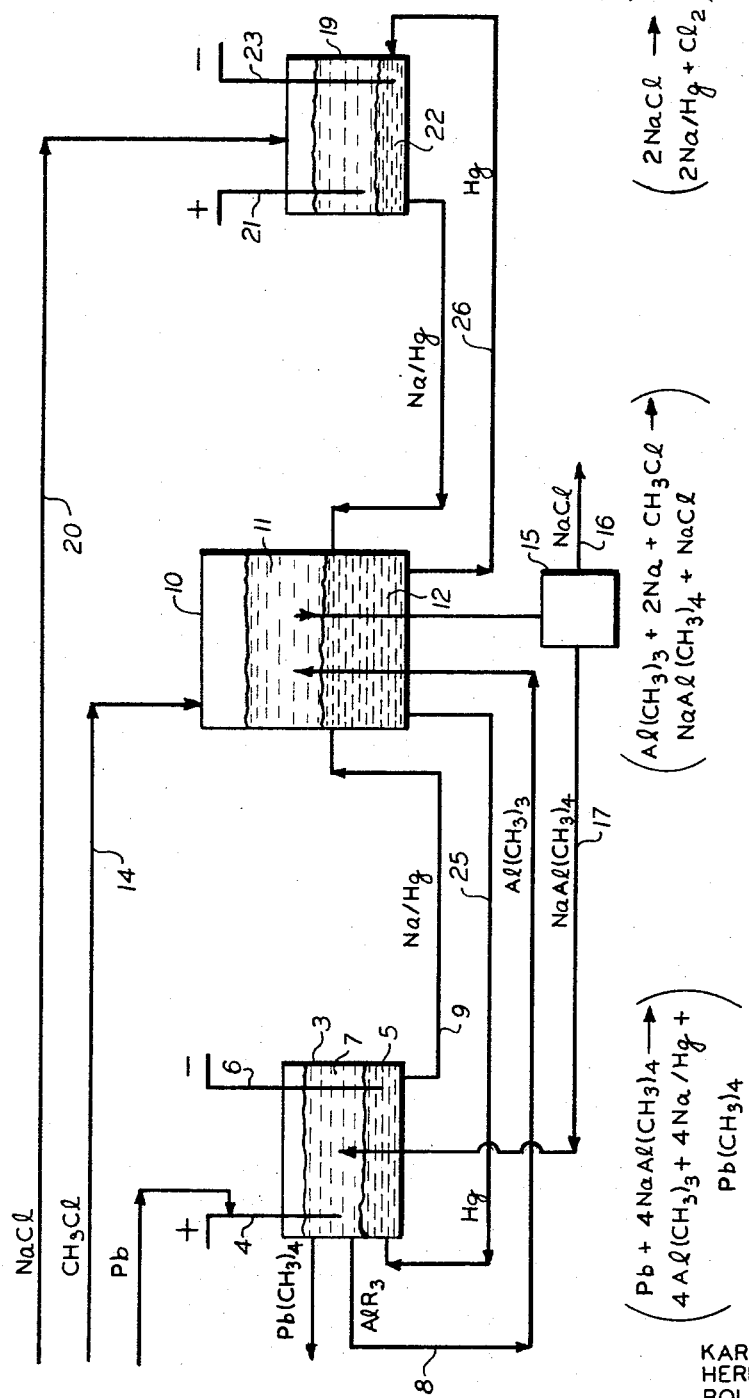

In application Ser. No. 193,330, filed May 8, 1962, abandoned in favor of Ser. No. 629,063, filed Apr. 7, 1967, assigned to the assignee of the instant application a process is described by which it is possible to manufacture organic alkali complex compounds of aluminum and/or boron by causing certain aluminum or boron compounds, even those containing oxygen, to react with alkali metals and haloalkyls under appropriate conditions. Furthermore, the authors J. B. Honeycutt Jr., and J. M. Riddle have reported in the J. Am. Chem. Soc., 83, pp. 369–373 (1961) that something of the same sort is possible also with boron trialkyl. The reaction required for such transpositions can be formulated as follows:

$$ZR_3 + 2Me + R'X = Me[ZR_3R'] + MeX \qquad (I)$$

In this equation, Z stands for boron or aluminum, R for identical or different alkyl radicals in any combination, or alkoxyl radicals —OR" (R"=alkyl, cycloalkyl, and in some cases aryl), and R' stands in any case for a hydrocarbon radical, while Me represents alkali metal and X represents halogen, especially chlorine.

When this process is applied to the transformation of aluminum trialkyl to the corresponding alkali aluminum tetraalkyls, difficulty is encountered because aluminum trialkyls react with sodium according to the equation $4AlR_3 + 3Na = 3NaAlR_4 + Al$. While the same organic aluminum end product is obtained in this manner, the desired transposition with the alkyl halide does not take place. Thus, competing reactions can occur. It is often difficult to determine whether any alkyl radicals from the alkyl halides go over to the desired end product.

The invention relates to a similar kind of process which, unlike the above-described process, can be applied advantageously to the trialkyl aluminums as well as the alkyl borons.

The subject of the invention is accordingly a process for the manufacture of organic alkali complex compounds of aluminum and/or boron of the general formula $Me[ZR_3R']$ in which Me stands for alkali metal, especially sodium, potassium or lithium, Z stands for boron or aluminum, and R and R' stand for alkyl radicals or, if desired, one or more of the radicals R, is the radical —OR" (R"=alkyl, cycloalkyl or aryl radical, preferably alkyl or cycloalkyl), by the transposition of compounds of the general formula $ZR_3$, in which Z and R have the above-stated meaning, with alkali metal and an alkyl halide R'X, which is characterized by the fact that the alkali metal enters the reaction as an amalgam.

The term "amalgam" in this case will be understood to mean, within the framework of this specification, especially those mixtures of alkali metals, particularly sodium or potassium, and mercury which contain comparatively little alkali metal and much mercury. In particular, amalgams are used according to the invention which are still fluid or semifluid at ordinary or moderately elevated temperature, that is, amalgams having, say, a maximum of about 1% sodium or potassium, or other alkali metal.

It is surprising that alkali metals can be used in the form of such amalgams for the reaction of the invention, since it is generally known that the reactivity of the alkali metals is very greatly reduced in the amalgams. Also, it has been stated in the literature that mercury alkyls form from alkali amalgam and alkyl halide. It was to be expected that this reaction would also take place during the process of the invention nad result in undesired by-products. Amazingly, however, this reaction evidently is nearly completely forestalled in the presence of the aluminium- or boron-containing reactants.

As compounds of the general formula $ZR_3$, those especially are used according to the invention in which the radicals R are alkyl radicals. It is especially preferable to choose compounds with identical alkyl radicals. Even though the use of $ZR_3$ compounds in which at least one radical R represents an oxygen-containing radical —OR" comes within the scope of the invention, nevertheless, the use of trialkyl compounds is preferred. However, if oxygen-containing radicals such as —OR" are present in the starting compounds, then R" can also signify alkyl radicals, preferably with up to about 20 carbon atoms, or cycloalkyl radicals, or in some cases even an aryl radical. The alkyl halide R'X is preferably selected so that the alkyl radical R' is the same as the alkyl radicals R in the compound $ZR_3$. Particularly suitable for the transposition reaction of the invention is, for example, trimethyl aluminum or triethyl aluminum, on the one hand, and the alkyl chloride corresponding thereto, i.e. methyl chloride or ethyl chloride, on the other. On the whole, it is preferable to work with lower alkyl radicals, that is, for example, those having up to about four carbon atoms, in the starting compounds. R and R" are preferably lower alkyl radicals.

It is expedient according to the invention—and in some cases it may be particularly advantageous, as for example in the manufacture of potassium compounds using potassium amalgam—to have solvents present in the reaction. In particular, solvents of the ether type are appropriate. It is expedient to select those ethers, or other solvents, in which not only the organic starting compounds, but also the resultant complex organic reaction products are sufficiently soluble. For the production of alkali aluminum tetramethyl, for example, tetrahydrofuran and ethers of the tetrahydrofuran type are especially suitable; also well suited are open chain ethers like the dialkylethers or preferably dimethylethers of glycol, diglycol, and triglycol. Also suitable as solvents are the products of the reaction of monoalkyl di-, tri-, and polyglycols with aluminum alkyls, especially aluminum trimethyl (for the production of alkali aluminum tetramethyl). These reaction products have the general formula $CH_3O[CH_2CH_2O]_nCH_2CH_2OAlR_2$. The $AlR_2$ group on the end remains unaffected by the reaction if the reaction is controlled in the manner described herein, and these substances act only in their properties as ethers. In any case, the R on the aluminum is preferably the same as the alkyl of the trialkyl aluminum being used.

In the reaction of the invention heat is evolved, and therefore, the reaction mixtures become hot so that they have to be cooled. It is best to operate in a temperature between about 0° and 80°, and preferably between 20° and 60°. These limits are due to the fact that, on the one hand, the reaction may come to a halt at too low a temperature, but, on the other hand, at too high a temperature, the desired reaction product that develops goes on to react with the halogen compounds, approximately as follows:

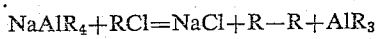

$$NaAlR_4 + RCl = NaCl + R-R + AlR_3$$

The faster the reaction takes place, due to an appropriate enlargement of the mercury surface as it will be explained later, the higher the experimental temperature can be made, because this secondary destruction of the reaction product by the halogen compound depends, of course, on the time of contact between the halogen compound and the quaternary alkali aluminum or alkali boron compounds, as the case may be, and the loss through the secondary reaction can be kept low if the entire transposition is performed very rapidly.

In certain cases it may be indicated to operate under pressure, especially when working with low boiling halogen compounds, for instance, such as ethyl chloride or methyl chloride.

It is possible to follow the course of the reaction of the invention by determining the decrease in the alkali concentration in the amalgam or the increase in the alkali concentration in the solution. If the reaction is going perfectly, and if the reaction product of the invention is completely soluble in the reaction medium, precisely half of the alkali leaving the mercury has to go into the solution. If the reaction product is entirely soluble in the medium, all that is needed for purification is to let the alkali chloride that forms settle out or to filter it out and concentrate the solution in a vacuum and, of course, with the exclusion of air. If, however, the reaction product has precipitated in whole or in part together with the alkali halide, it has to be extracted in an appropriate solvent after filtration. As a rule, tetrahydrofuran or diethylether will be suitable for this purpose. Often, however, it is not at all necessary to isolate as such the substances manufactured according to the invention, since their solutions can be used directly. This is especially the case with the solutions of sodium aluminum tetramethyl or tetraethyl in tetrahydrofuran or in the methyl ethers of glycol or diglycol and triglycol, respectively, since these solutions can be used directly for the electrolytic production of metal alkyls, such as tetramethyl or tetraethyl lead as is described in application Ser. No. 196,586, filed May 22, 1962 now U.S. Patent No. 3,254,558 and assigned to the assignee hereof. If mercury cathodes are used as is described in application Ser. No. 196,586, the alkali amalgam produced in the reaction vessel by the reaction of the instant invention, will amount to half of the alkali amalgam taken from the electrolysis and treated according to the invention for production of the electrolyte introduced into the cell (in the process of the instant invention, half of the sodium in the amalgam goes to production of electrolyte for re-introduction into the cell, while half goes to production of, for example, sodium chloride). Where according to the process of Ser. No. 196,586 there is produced in the cell a liquid medium comprising trimethyl or triethyl aluminum dissolved in a solvent, this medium can be introduced as such into the process of the invention for reaction of the trialkyl aluminum compound with sodium and alkyl halide to regenerate electrolyte. It is not necessary to effect a complete separation of lead compounds from the liquid medium, since lead compounds do not interfere with the reaction of the invention.

Thus, the invention provides a process for manufacture of metal methyl compounds such as lead tetramethyl. The process can involve passing an electrolysis current between an anode of the metal of the metal methyl compound to be produced and a mercury cathode, through an electrolyte of the formula $Me[ZR_3R']$, wherein the nomenclature is as described above, with the proviso however that the electrolyte includes at least one methyl group. By such electrolysis, the metal methyl compound is formed at the anode and an alkali amalgam is formed at the mercury cathode.

During the electrolysis, $ZR_3$ is formed in the cell. According to the invention, electrolyte is regenerated by reacting $ZR_3$ from the electrolysis, alkali metal in the amalgam from the electrolysis, and alkyl halide of the formula R'X wherein R' is as defined hereinbefore and X is halogeno, to produce $Me[ZR_3R']$. This regenerated electrolyte may be utilized again in the electrolysis. The electrolyte in the electrolysis can be sodium or a mixture of sodium and potassium containing up to about 80% potassium and for such electrolytes a sodium amalgam is formed.

As discussed above, in the reaction of the invention, not all of the sodium present in the amalgam is recovered in the complex produced in the reaction, and some of the sodium (or other alkali) goes to production of sodium halide (or other alkali halide). To provide make-up for alkali leaving the process as alkali halide, an alkali halide can be subjected to electrolysis employing a mercury cathode and, thereby, an alkali amalgam can be produced. This alkali amalgam can then be used in the process of the invention as is required to provide for the desired make-up.

The speed of the reaction can be controlled in the process of the invention by varying the surface area of the amalgam.

If, for example, a solution of 67.5 g. trimethyl aluminum in 200 cc. diglym (2,2-dimethoxy-diethylether) is placed in a glass flask over 2.87 kg. of an amalgam containing 0.59% sodium, and is stirred at room temperature while introducing methyl chloride into it, with the exclusion of air, the solution soon becomes turbid due to the separation of sodium chloride, but it takes 9 hours for the reaction to end. The speed of reaction, however, can be increased as much as desired. All one needs to do is increase the contact surface of the mercury by appropriate measures. This can be done, for example, by intense agitation, in which the amalgam is broken up into a suspension of many very small droplets, the surface being enlarged accordingly; however, this is not the best method, because mercury, and especially amalgam is inclined, in the presence of suspended solids (alkali chlorides), to form very stable emulsions and unctuous products which then create difficulties when one attempts to separate the closely coherent mercury layers. A far better method consists, for example, in covering the trough-like bottom of the reactor with a relatively thin layer of mercury and then causing a plurality of round metal disks mounted on a horizontal shaft to revolve in the reactor. These disks plunge down into the mercury and cover themselves during the rotation with a coating of amalgam which constantly renews itself. The space between the disks need be no greater than about 2 mm. In this manner, the formation of emulsions is prevented, and nevertheless the amalgam is constantly being presented in a very large surface area. It is easy in this manner to accelerate the reaction by from 5 to 100 times. The apparatus described above is intended only as an example as to how the mercury area can be enlarged by simple measures. There are, of course, many other possibilities, such as letting the amalgam flow through a trickling tower filled with a packing, preferably of a material such as copper or copper-coated iron, so that the mercury spreads over their entire surface as a film as it trickles down through the column, or a system of metal disks disposed horizontally one over the other in a vertical cylinder and containing holes alternately in the center and at the periphery, so that mercury fed in at the top has to pass over all the disks on its way down, flowing alternately inward and outward over the disks, while the solution of the other reactant flows together with the alkyl halide through the cylinder in the same direction or in the opposite direction.

The preferred apparatus, however, is that described above wherein disks are rotated to move amalgam from the pool thereof into the layer containing the $ZR_3$. Thus, the invention provides apparatus suitable for contacting fluids present as separate phases to provide a large interface area between the fluids. The apparatus comprises a vessel for holding the fluids one above the other as a lower phase and an upper phase, and a plurality of substantially parallel disposed vertically extending plates mounted in the vessel to extend from within the lower phase to within the upper phase. Means are provided for rotating the plates about their perpendicular axes to interchange plate surface in one of the phases with plate surface in the other of the phases.

The process of the invention fills an important gap in the knowledge of organometallic reactions which has been acquired in recent years. It is particularly important in connection with the electrolytic manufacture of metal alkyls especially lead alkyls. This is made clear, for example, by the following consideration: The electrolytic manufacture of tetraethyl lead is best achieved by the use of mercury cathodes, as for example by the method of application Ser. No. 27,220, filed May 5, 1960 and now abandoned and Ser. No. 129,009 filed Aug. 3, 1961, now U.S. Patent No. 3,164,538 both assigned to the assignee of the instant application. The ethyl groups can be brought into the electrolytes as a complexly bound ethyl sodium [e.g. $NaAl(C_2H_5)_4$] which is formed by the addition of ethylene to complexly bound sodium hydride [e.g. $NaAl(C_2H_5)_3H$]. The sodium amalgam formed at the cathode and which is taken out of the cell cannot be transformed as such back into sodium hydride; it is therefore necessary either to extract the sodium as such from the amalgam by a secondary electrolysis, or to feed fresh sodium continually into the process, in which case the sodium would be recovered in the form of sodium hydroxide, i.e., in a greatly depreciated form.

On the other hand, methyl compounds of metals, especially tetramethyl lead, can be produced only through methyl chloride. There is no way of doing it through sodium hydride, in which all of the sodium is recovered in the course of the electrolysis. That means that, in the manufacture of, let us say, tetramethyl lead, it is necessary to expend 4 atoms of sodium for each molecule of the desired product in order to dechlorinate the methyl chloride. According to the invention, it is possible to combine the electrolytic manufacture of tetraethyl lead with the electrolytic manufacture of tetramethyl lead, thus pointing out a new way towards a very advantageous purification of the amalgam from the tetraethyl lead process, which results in a substantially more valuable product than sodium hydroxide, and which eliminates the investment in a secondary electrolysis. For every mol of tetraethyl lead it is possible additionally to produce one mol of tetramethyl lead, and this ratio corresponds approximately to the one in which these two substances are best used in practice.

The process of the invention on the other hand also creates the possibility of joining the electrolytic production of tetraethyl or tetramethyl lead to the industrial electrolysis of alkali chloride in which the alkali metals are produced in the very cheap form of a sodium amalgam.

It is not necessary in the process of the invention to react all of the alkali metal out of the amalgam for this would make the reaction very much slower towards the end. It is better to remove only a part of the alkali metal and to process the rest into another product say alkali hydroxide or to feed the mercury still containing alkali metal into an electrolysis process (alkali chloride cell or lead tetraalkyl cell) for restoration.

Figure 2:
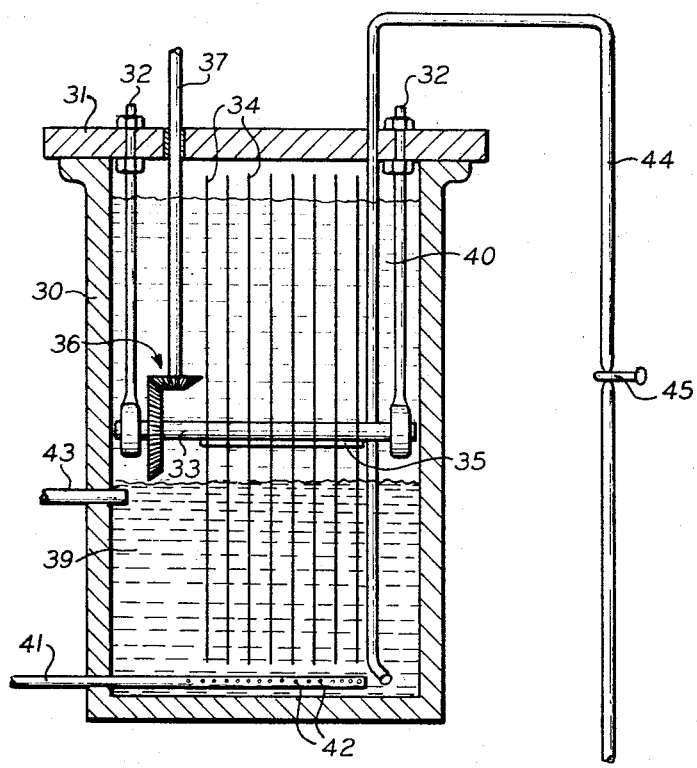

The invention is further described in reference to the accompanying drawings wherein:

FIG. 1 is a flow diagram indicating utilization of the process of the invention in combination with a process for electrolytic production of lead tetramethyl; and FIG. 2 is a showing in elevation and cross-section of apparatus according to the invention.

Referring to FIG. 1, the process depicted here is for the production of lead tetramethyl in the electrolysis cell 3. This cell is provided with lead anode 4 and mercury cathode 5. The mercury cathode 5 is connected into the circuit for the electrolysis by the conductor 6. The electrolyte 7 is $NaAl(CH_3)_4$, and during the electrolysis, lead tetramethyl, sodium amalgam, and aluminum trimethyl are formed. The reaction is indicated by an equation beneath the cell 3. The lead tetramethyl is taken as product; the aluminum trimethyl and sodium amalgam are passed, respectively, through lines 8 and 9 to the reactor 10. In the reactor 10 there is an upper layer 11 into which the aluminum trimethyl is introduced, and a lower layer 12 into which the amalgam containing the sodium is introduced. Further, methyl chloride is introduced into the reactor 10 through line 14. The reaction according to the invention is indicated in an equation below the reactor 10, and as is there indicated, electrolyte for use in the electrolytic cell 3 is formed in the reactor 10. In admixture with the regenerated electrolyte is sodium chloride formed in the reactor 10. The admixture is passed through a separating vessel 15 and sodium chloride is removed through line 16, while the electrolyte is returned to the cell 3 via line 17.

To provide make-up for the sodium lost as sodium chloride through line 16, sodium chloride is electrolyzed in cell 19. Sodium chloride is introduced into the cell through line 20 and a current is passed from the anode 21 to the mercury cathode 22, which is provided in the electrical circuit by means of the conductor 23. Sodium amalgam is formed at the cathode 22 and is withdrawn and passed to the reactor 10. The sodium contained in this amalgam is make-up for the sodium lost as sodium chloride. Mercury depleted in sodium is withdrawn from the reactor 10 via lines 25 and 26 and is passed, respectively, to the cell 3 and the cell 19.

Preferred apparatus for effecting the reaction of the invention is shown in FIG. 2. The apparatus comprises a vessel 30, preferably a glass vessel, and the vessel is outfitted with a tightly fitting top 31. Suspended from the top 31 by supports 32 is a horizontally extending shaft 33, and mounted on this shaft are plates 34. The plates are desirably in the form of disks and are fixedly mounted on the shaft by the key 35. A gear connection 36 is provided on the shaft and the gear connection is driven by shaft 37, whereby the shaft 33 and therefor the disks 34 can be rotated.

In utilization of the apparatus, a lower liquid layer 39 made up of sodium amalgam is present in the vessel, and an upper liquid layer 40 flows on the lower liquid layer. The upper liquid layer 40 includes the $ZR_3$ to be reacted with sodium and alkyl halide for effecting the reaction of the invention. An inlet 41 for the alkyl halide is provided at the bottom of the vessel, and this inlet has perforations 42 so that the alkyl halide can be introduced into the reactor as bubbles and can pass upward through the layers for the desired reaction. To facilitate feeding of alkali amalgam to the vessel, an inlet 43 is provided, and for withdrawal of mercury depleted in alkali, a siphon outlet 44 having a pinch stop 45 is provided.

In operation of the apparatus, as the disks rotate, they pick up alkali amalgam from the lower layer 39 and carry this amalgam upwards into the upper layer 40, whereby a large interface is obtained between the two liquid phases involved in the reaction.

*Example 1*

In a one-liter flask with three mouths and a drain cock in the bottom, 3.15 kg. of amalgam containing 17 g.=0.435 mol of potassium are stirred with 15.8 g.=21 ml.=0.22 mol trimethyl aluminum and 250 ml. 2,2'-dimethoxydiethylether in an argon atmosphere at room temperature. Methyl chloride is introduced into the solution at a rate of about 6 liter per hour until, after about 40 to 60 minutes, saturation is achieved. Even after about 15 minutes, the solution begins to become turbid due to the precipitation of potassium chloride. The temperature slowly rises to 29°, where it is maintained by blowing air against the reaction flask. The alkali value of the amalgam drops within 2½ to 3 hours to one half, and after a total of 8 hours it decreases to 0. The agitator is then turned off, and the potassium chloride very rapidly settles on the surface of the mercury. The clear solution above it then contains 49% of the original amount of potassium (determined by titration after hydrolyzing a specimen). To isolate the pure complex salt, the mercury and the precipitated potassium chloride are separated from the solution and the solution is evaporated dry in a gradually increasing vacuum which finally amounts to $10^{-3}$ torr and 160° bath temperature. The crude complex salt thus obtained in a yield of 49.5% (with reference to the original amount of potassium) had the following analysis:

K=29.7%, Al=20.6%
(calculated: K=31.0%, Al=21.45%)

A small recrystallized specimen showed the theoretical values. The potassium aluminum tetramethyl solution first produced can be used directly for the electrolytic production of lead tetramethyl without isolating the complex salt.

*Example 2*

In the same manner as in Example 1, 3.25 kg. of amalgam containing 20.8 g.=0.905 mol of sodium (0.64% Na), and 32.4 g.=0.45 mol of trimethyl aluminum in 250 ml. of 2,2'-dimethoxy-diethylether are treated with methyl chloride. The reaction is ended after 10 hours. 53% of the original sodium is found in the sodium chloride and 46% in the solution. The isolated crude complex salt contains 20% Na and 23.4% Al (calculated: Na=20.9%; Al=24.5%). Here again the sodium aluminum tetramethyl can be used immediately for the electrolysis of tetramethyl lead without first isolating the solid salt.

*Example 3*

The procedure is as in Example 1, but 28.6 g. (0.22 mol) of dimethyl aluminum butylate—$(CH_3)_2AlOC_4H_9$—are used instead of the 15.8 g. (0.22 mol) of trimethyl aluminum. At a slower speed of reaction than in the experiment in Example 1, the potassium vanishes from the amalgam within about 12 to 14 hours. After separating the potassium chloride and the solvent, 37 grams are obtained of solid, crystalline $K(CH_3)_3AlOC_4H_9$ are obtained, i.e., 92% of the theory.

*Example 4*

The procedure is the same as in Example 1, but tetrahydrofuran is used as the solvent. In this case, however, the speed of reaction is substantially slower and the reaction is approximately finished after 23 hours. The potassium aluminum tetramethyl yield after processing, however, is practically quantitative.

*Example 5*

The reaction vessel is a cylindrical glass tank of about 110 mm. inside diameter and 30 cm. high, with a flat-ground top edge. It can be closed at the top by a flat cover of metal or plastic. On the bottom there is a drain of about 8 mm. inside diameter, from which the amalgam can be taken through an amalgam filled siphon in the continuous process. Above the bottom of the tank is an amalgam filled cup. Just above the cup there revolves a horizontal shaft on which about 20 metal disks made of copper, nickel or other metal that can be wetted by the mercury or amalgam are placed at about 1 to 2 mm. apart from one another; these metal disks have a diameter of 9.5 cm., and their lower halves are immersed in the mercury and become covered during rotation with a constantly renewing coating of amalgam. The shaft is driven through a pair of bevel gears by a rotating vertical shaft passed through the cover. The speed of rotation of the disks amounts to from 5 to 50 r.p.m. The reaction vessel, which has been dried and filled with inert gas before the start of the operation, is filled with 2000 cc. of a solution of 150 g. trimethyl aluminum (2.08 mol) in 2,2'-dimethoxydiethylether. Approximately 2.4 kg. of an 0.4% sodium amalgam containing 9.5 g. (0.41 gram-atoms) of sodium, are placed in the cup. Methyl chloride is now passed into the solution at a rate of 6 to 10 liters per hour, and the reaction is followed by checking the increase in the concentration of the organometallically bound sodium in the solution. If no fresh sodium amalgam is supplied during the reaction, the sodium content in the amalgam will drop within one hour to zero. It is expedient to add 0.4% sodium amalgam either in portions or continuously apace with the consumption of sodium by the reaction, namely at the rate of 2.4 kg. per hour. Amalgam impoverished of sodium will then spill over a lip on the cup, and it can be reused in the reaction after replenishment either with metallic sodium or, advantageously, by the electrolysis of sodium salts or organic sodium aluminum complex compounds in the course of the electrochemical synthesis of metal alkyls. Within 10 hours all the trimethyl aluminum is used up; the solution containing the sodium chloride in suspension is drained out of the reaction vessel and the sodium chloride is filtered out. The solution can then be transferred directly to an electrolysis cell to be used as an electrolyte for the electrochemical synthesis of methyl metal compounds, e.g. lead tetramethyl, or it can be freed of the diglym to isolate the complex compound sodium aluminum tetramethyl as described in the preceding examples.

The yield of sodium aluminum tetramethyl amounts to 97% with reference to the original aluminum trimethyl.

It is self evident that the reaction mentioned in the other examples can also be performed advantageously in the apparatus herein described.

*Example 6*

1000 g. of an 0.7% sodium amalgam (7 grams of sodium=0.3 gram atoms) are intensely agitated in a reaction vessel which has been dried and filled with inert gas and contains 70 cc. of a benzene solution of triethyl aluminum (containing 17 g. equivalent to 0.15 mol of triethyl aluminum), while ethyl chloride is introduced. The course of the reaction is followed by checking the decrease in the sodium content in the amalgam. After about 4 hours the reaction has ended and the sodium content in the amalgam has fallen practically to zero. After the separation of the mercury, the dissolved ethyl chloride is removed by the application of a low vacuum; the mixture is then heated to 80°, whereupon the sodium aluminum tetraethyl goes into solution. The solution is now filtered hot, with the exclusion of air, and thus is freed from the sodium chloride. Upon cooling, the sodium aluminum tetraethyl crystallizes out of the benzene solution practically quantitatively. The crystals are filtered off and dried, again under the usual precautions for the processing of substances sensitive to air and moisture.

24 grams of sodium aluminum tetraethyl are obtained with a melting point of 125°. The yield is 95% with reference to the original aluminum tetraethyl, and 48% with reference to the original sodium.

*Example 7*

The procedure is as described in Example 6, but an 0.7% potassium amalgam is used instead of the sodium amalgam, and, instead of the benzene solution of triethyl aluminum, one of the compounds $$Al(C_2H_5)_3 \cdot (C_2H_5)_2O$$

$Al(C_2H_5)_3 \cdot Bu_2O$, and $Al(C_2H_5)_3 \cdot THF$ or their solutions in the corresponding ethers is used. In all cases, potassium aluminum tetraethyl is obtained in good yield. Instead of the above-named ethers, dialkyl ethers of glycol, diglycol and triglycol can also be used. Alternatively, as solvent the product of the reaction of semiethers of glycol, diglycol or triglycol with triethyl aluminum can be used. Such a reaction product can be represented by the following formula:

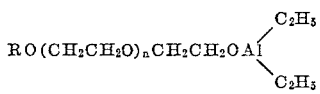

wherein $n = 0, 1, 2$.

*Example 8*

2.5 kg. of potassium amalgam containing 15 g. (0.384 gram atom) of potassium are stirred together with a solution of 19 g. of boron triethyl in 200 cc. of 2,2'-dimethoxy-diethyl ether at 40°. Ethyl chloride is introduced at a rate of about 4 to 5 liters per hour. At a reaction temperature of 40°, the alkali content in the amalgam drops within 15 hours from 0.61 to 0.15% by weight. After separating the mercury, the suspension is filtered and thus freed of potassium chloride. Then the excess boron triethyl and the solvent are distilled off at a final vacuum of $10^{-3}$ torr at 100°. 24 grams of pure potassium boron triethyl are obtained with a melting point of 156°.

*Example 9*

2736 grams of an 0.58/ potassium amalgam, 50 grams of aluminum triethyl dibutyletherate, and 16.1 grams of propyl chloride are intensely agitated for 8 hours in 100 cc. benzene at 40° C. Within this period, the potassium content decreases from 0.58 to 0.1%. The benzene solution is siphoned free of the mercury and is freed of the potassium chloride by filtration. Then the solvent and the excess propyl chloride are distilled off in a vacuum of about 15 torr at a maximum of 40°. The unconsumed $Al(C_2H_5)_3 \cdot Bu_2O$ is then distilled off at the higher vacuum of $10^{-3}$ torr at 80 to 100°. The distillation residue, which is liquid while hot, crystallizes upon cooling, and is analytically pure $K[Al(C_2H_5)_3C_3H_7]$. The yield corresponds to 40% of the reacted potassium, i.e., 80% of the theory.

*Example 10*

In the same manner as in Example 1 or 2 2.54 kg. of amalgam containing 16.5 g.=0.72 mol of sodium (0.65% Na) and 49 g.=0.68 mol of trimethyl aluminum in 200 ml. of 2,2'-dimethoxy-diethylether are treated under stirring with methylbromide. The temperature quickly rises to nearly 35°, where it is maintained by cooling the reaction flask. The alkali value of the amalgam decreases within 2½ to 3 hours to 0. The solution is then separated from the mercury, the NaBr is filtered off. The clear solution contains 43% of the original amount of sodium (determined by titration after hydrolyzing a specimen), 57% of the orginal sodium is found in the sodium bromide.

The solution of the sodium-aluminum-tetramethyl can be be used immediately for the electrolysis of tetramethyl lead without first isolating the solid salt.

*Example 11*

In the same manner as described in Example 10 sodium amalgam and a solution of aluminum-triethyl or aluminum-tripropyl or aluminum-tri-n-butyl can be treated with ethylbromide, propylbromide or butylbromide. The sodium-aluminum tetraethyl, the sodium-aluminum tetrapropyl or the sodium-aluminum tetra-n-butyl can be isolated in good yield.

Temperatures indicated in the application is in ° C. unless otherwise specified.

What is claimed is:

1. In a process for production of alkali organic complex of the formula $Me[ZR_3R']$ in which:
   (a) Me is an alkali metal;
   (b) Z is selected from the group consisting of boron and aluminum;
   (c) R is selected from the group consisting of alkyl and —OR'' wherein R'' is selected from the group consisting of alkyl, cycloalkyl and aryl; and
   (d) R' is alkyl;

which comprises reacting a compound of the formula $ZR_3$ wherein Z and R are as defined above, with alkali metal and alkyl halide of the formula R'X wherein R' is as defined above and X is halogeno, the improvement which comprises using alkali metal amalgam in the reaction as source for alkali metal for the reaction.

2. Process according to claim 1, wherein said alkali metal is selected from the group consisting of sodium, potassium, and lithium.

3. Process according to claim 2, wherein R and R'' are lower alkyl radicals.

4. Process according to claim 3, wherein R and R'' are alkyl radicals having up to 2 carbon atoms.

5. Process according to claim 2, wherein the alkyl halide is an alkyl chloride.

6. Process according to claim 2, wherein the compound $ZR_3$ is contained in a liquid medium consisting essentially of the compound $ZR_3$ in solution in a solvent therefor.

7. Process according to claim 2, wherein the compound $ZR_3$ is contained in a liquid medium consisting essentially of the compound $ZR_3$ in solution in a solvent therefor, said solvent being selected from the group consisting of: tetrahydrofuran, dialkyl ethers of glycol, diglycol, and triglycol, and products of reaction of a monoalkyl glycol having at least four carbon atoms and trialkyl aluminum.

8. Process according to claim 7, wherein the compound $ZR_3$ is $AlR_3$, and the solvent is a reaction product of a monoalkyl glycol having at least four carbon atoms and trialkyl aluminum.

9. Process according to claim 2, the reaction being carried out at a temperature in the range of about 0–80° C.

10. Process according to claim 2, wherein the reaction is carried out at a temperature of about 20–60° C.

11. Process according to claim 2, wherein the compound $ZR_3$ is aluminum trimethyl, and the alkyl halide is methyl chloride.

12. Process according to claim 2, wherein the compound $AlR_3$ is aluminum triethyl and the alkyl halide is ethyl chloride.

13. Process according to claim 1, wherein the alkali metal amalgam contains up to about 1% alkali metal.

14. Process according to claim 2, wherein the alkali metal amalgam contains up to about 1% alkali metal.

15. Process according to claim 11, wherein the alkali metal amalgam contains up to about 1% alkali metal.

16. Process according to claim 12, wherein the alkali metal amalgam contains up to about 1% alkali metal.

17. Process according to claim 1, wherein said alkali organic complex compound contains at least one methyl group.

18. Process according to claim 1, wherein each R is methyl.

19. Process according to claim 18, wherein Z is aluminum.

20. Process according to claim 19, wherein R' is methyl.

21. Process according to claim 20 wherein R'X is methyl chloride.

22. Process according to claim 21, wherein the alkali metal is sodium.

References Cited

UNITED STATES PATENTS

| | | | |
|---|---|---|---|
| 2,838,556 | 6/1958 | Cattle et al. | 260—448 |
| 3,007,970 | 11/1961 | Ashby | 260—606.5 |
| 3,285,947 | 11/1966 | Ziegler et al. | 260—448 |

TOBIAS E. LEVOW, *Primary Examiner.*

H. M. S. SNEED, *Assistant Examiner.*

UNITED STATES PATENT OFFICE

CERTIFICATE OF CORRECTION

Patent No. 3,361,781                      January 2, 1968

Karl Ziegler et al.

It is hereby certified that error appears in the above numbered patent requiring correction and that the said Letters Patent should read as corrected below.

Column 3, line 63, for "3,254,558" read -- 3,254,008 --.

Signed and sealed this 1st day of April 1969.

(SEAL)
Attest:

Edward M. Fletcher, Jr.
Attesting Officer

EDWARD J. BRENNER
Commissioner of Patents